United States Patent [19]

Kashima et al.

[11] Patent Number: 4,468,472

[45] Date of Patent: Aug. 28, 1984

[54] COMPOSITION FOR CERAMIC DIELECTRICS

[75] Inventors: Masao Kashima; Yasuo Miyashita, both of Saitama, Japan

[73] Assignee: Mitsubishi Mining & Cement Company, Ltd., Tokyo, Japan

[21] Appl. No.: 449,384

[22] Filed: Dec. 13, 1982

[30] Foreign Application Priority Data

Dec. 17, 1981 [JP] Japan .................................. 56-204211

[51] Int. Cl.$^3$ .............................................. C04B 35/49
[52] U.S. Cl. .................................... 501/137; 361/321; 501/138; 501/139; 501/152
[58] Field of Search ............... 501/135, 136, 137, 138, 501/139, 152; 361/321

[56] References Cited

U.S. PATENT DOCUMENTS

| | | | |
|---|---|---|---|
| 2,469,584 | 5/1949 | Wainer et al. | 501/135 |
| 3,764,529 | 10/1973 | Matsuo et al. | 501/139 |
| 4,014,707 | 3/1977 | Tanaka et al. | 501/139 |
| 4,353,047 | 10/1982 | Noguchi et al. | 501/138 |
| 4,404,029 | 9/1983 | Iwaya et al. | 501/139 |

FOREIGN PATENT DOCUMENTS

| | | | |
|---|---|---|---|
| 51-87799 | 7/1976 | Japan | 501/135 |
| 52-1119 | 1/1977 | Japan | 501/152 |

OTHER PUBLICATIONS

Okazaki, K.–*Ceramic Engineering for Dielectrics* (Rev. Ed.), 1978, pp. 280–284.

*Primary Examiner*—Helen M. McCarthy
*Attorney, Agent, or Firm*—Edward J. Brenner

[57] ABSTRACT

A composition for ceramic dielectrics comprising BaO, $CeO_2$, $ZrO_2$, CaO and $TiO_2$ in sintered state. The composition can also contain at least one of $MnO_2$, $Cr_2O_3$, FeO, NiO, and CoO as additive. As the composition is very fine in grain size, and has a prolonged life, it is very suitable for a raw material of such a product as a layer-built capacitor which is used in high electric field.

2 Claims, No Drawings

COMPOSITION FOR CERAMIC DIELECTRICS

BACKGROUND OF THE INVENTION

The present invention relates to a composition for ceramic dielectrics which is very fine in grain size and has a prolonged life and further obtains a capacitance value which improves a temperature dependence of capacitance.

Conventionally, as a high dielectric constant composition for ceramic dielectrics, there has been used a barium titanate of which the Curie point is made to be shifted to about a room temperature by adding strontium titanate, barium stannate, calcium stannate, or barium zirconate as a shifter. However, the grain size of the thus treated barium titanate is not less than 5 $\mu$m, consequently it is unsuitable for a raw material of such a product as a layer-built capacitor which is used in high electric field. Namely, in the case where the grain size is large, an electric field strength falling on one grain becomes higher and consequently a breakdown voltage becomes lower and defects due to voids concentrating at the grain boundary also are made to be increased, and a life becomes shorter, thus resulting in a lowering of reliability.

The present inventors have investigated to overcome the above mentioned defects of conventional compositions and provide a composition for ceramic dielectrics which is very fine in grain size, not more than 5 $\mu$m, and has a prolonged life and have found out that a composition for ceramic dielectrics obtained by adding oxides of Ce, Zr and Ca to the barium titanate, instead of the above mentioned shifter, is refined to be very fine in grain size. Thus, the inventors have accomplished the present invention.

BRIEF SUMMARY OF THE INVENTION

The primary object of the present invention is to provide a composition for ceramic dielectrics which is very fine in grain size.

The secondary object of the present invention is to provide a composition for ceramic dielectrics which has a prolonged life.

The other object of the present invention is to provide a composition for ceramic dielectrics which possesses a capacitance value making a temperature dependence of capacitance improved.

According to the present invention, there is provided a composition for ceramic dielectrics comprising 24.5–53.4 mol % BaO, 1.0–3.5 mol % $CeO_2$, 0.1–2.0 mol % $ZrO_2$, 0.5–10.0 mol % CaO and 45.0–60.0 mol % $TiO_2$ at the conversion of said oxides of Ba, Ce, Zr, Ca and Ti to BaO, $CeO_2$, $ZrO_2$, CaO and $TiO_2$.

DETAILED DESCRIPTION OF THE INVENTION

The composition of the present invention, as shown in Examples, is very fine in grain size, consequently it is optimum for such a product as a layer-built capacitance which is used in high electric field. Namely, as the grain size thereof is fine, electric field strength falling on one grain becomes smaller, thereby the breakdown voltage is higher and the life is longer, resulting in an improvement of reliability.

Further, the composition of the present invention is sufficiently practical, for the dielectric constant thereof is high and the dielectric dissipation factor is low and the capacitance value can make a temperature dependence of capacitance improved.

Thus, that the grain size of the composition of the present invention is very fine is because a liquid phase which is generated in sintering of the raw material compounded corresponding with the composition as described above, makes the sintering temperature lower and suppresses excessive growth of the grain.

In the composition of the present invention, when the amount of barium oxide is less than 24.5 mol %, large grains grow to cause occurance of deposition to the setter, and when more than 53.4 mol %, the sintering becomes difficult. When the amount of cerium oxide is less than 1.0 mol %, the grain size becomes larger, and when more than 3.5 mol %, the shift of the Curie point is excessively larger to make the composition impractical. When the amount of zirconium oxide is less than 0.1 mol %, the dielectric dissipation factor becomes larger, and when more than 2.0 mol %, large grains grow. Calcium promotes sintering and is also effective as a shifter. But when the amount thereof is less than 0.5 mol %, no addition effect is seen, and when more than 10.0 mol %, the grain size becomes larger. When the amount of titanium oxide is less than 45.0 mol %, the sintering becomes difficult, when more than 60.0 mol %, large grains grow to cause occurance of deposition to the setter.

In the present invention, as described above, the main component composed of oxides of barium, cerium, zirconium, calcium and titanium is added with at least one oxide selected from the group consisting of oxides of Mn, Cr, Fe, Ni and Co as additives at the conversion of the additives to $MnO_2$, $Cr_2O_3$, FeO, NiO and CoO. In this case, the amount of the additive is 0.05–0.6 weight % of the main component.

These additives have effects of improving the sintering property of ceramics and also decreasing the dielectric dissipation factor and further improving the temperature dependence of the capacitance value. When the amount of the additives is less than 0.05 weight %, no addition effect is seen, and when more than 0.6 weight %, the dielectric dissipation factor becomes lower.

The composition of the present invention, for example, can be prepared as follows: the raw material is weighed to correspond to the component of the composition of the present invention after sintering to be mixed and pulverized in a wet ball mill. The thus obtained mixture is filtered and dried to be pressed to a prescribed form under pressure and sintered. In this case, as raw materials of the main component of the composition, $BaCO_3$ and $BaC_2O_4$ are preferable as barium compounds, $CeO_2$ and $Ce_2(C_2H_4)_3.9H_2O$ are preferable as cerium compounds, $ZrO_2$ and $3ZrO_2.CO_2.6H_2O$, are preferable as zirconium compounds, $CaCO_3$ and CaO are preferable as calcium compounds, and $TiO_2$ and $Ti_2(C_2H_4)_3.10H_2O$ are preferable as titanium compounds. And as raw materials of the additive, there are preferable $MnCO_3$, $MnO_2$, $Cr_2O_3$, $CrO_3$, FeO, $Fe_2O_3$, NiO, $NiO_2$, CoO and $Co_2O_3$.

The present invention will be understood more readily with reference to the following examples. The examples, however, are intended to illustrate the present invention and are not construed to limit the scope of the present invention.

EXAMPLE 1

As raw materials, $BaCO_3$, $CeO_2$, $ZrO_2$, $CaCO_3$ and $TiO_2$ of reagent first class grade are respectively weighed to correspond with the compounding ratio of the main component after sintering as shown Table 1 to be mixed and pulverized in a wet ball mill for 24 hours.

TABLE 1

| sample No. | main component composition ratio (mol %) | | | | | sintering temperature (°C.) | grain size (μm) | electric characteristics | | | | |
|---|---|---|---|---|---|---|---|---|---|---|---|---|
| | BaO | CaO | $CeO_2$ | $ZrO_2$ | $TiO_2$ | | | dielectric constant | dielectric dissipation factor (%) | temperature dependence of capacitance | | |
| | | | | | | | | | | −25° C. | 85° C. | maximum value |
| 1 | 53.4 | 0.5 | 1.0 | 0.1 | 45.0 | 1390 | 3.0 | 4500 | 3.8 | −30.1 | −10.7 | +13.2 |
| 2 | 47.2 | 1.0 | 1.5 | 0.3 | 50.0 | 1370 | 1.5 | 4720 | 1.7 | −6.3 | −33.5 | +8.0 |
| 3 | 42.0 | 3.0 | 2.0 | 0.5 | 52.5 | 1350 | 1.0 | 4110 | 1.4 | +21.7 | −36.8 | +21.7 |
| 4 | 36.5 | 5.0 | 2.5 | 1.0 | 55.0 | 1320 | 2.0 | 3490 | 1.2 | +42.0 | −39.1 | +42.0 |
| 5 | 30.5 | 7.5 | 3.0 | 1.5 | 57.5 | 1300 | 2.5 | 3070 | 1.0 | +60.2 | −54.1 | +60.2 |
| 6 | 24.5 | 10.0 | 3.5 | 2.0 | 60.0 | 1270 | 3.0 | 2740 | 0.7 | +48.1 | −59.0 | +48.1 |

The mixed and pulverized mixture is filtered and dried to be pressed under a pressure 3 ton/cm$^2$ to a disc of diameter 16 mm having a thickness 0.6 mm. The obtained discs are sintered for one hour at the sintering temperature as shown Table 1 and there are thus obtained Samples 1–6. The grain size of these samples is observed using an optical microscope at magnification 400. The dielectric constant, dielectric dissipation factor and temperature dependence of the capacitance of the capacitance value of these samples are measured by determinating the samples on both surfaces coated with silver electrode under the conditions of 25° C., 1.0 Vrms and 1.0 KH$_r$ using YHP Multi-frequency LCR meta model 4274A. The temperature dependence of capacitance is measured by determinating a capacitance value at 25° C. as a standard. The examination conditions and the results thereof are shown in Table 1.

Each of the obtained samples is a composition for ceramic dielectrics of which the grain size is not more than 3.0 μm and which has a sufficient dielectric constant, an excellent dielectric dissipation factor and an improved temperature dependence of capacitance. Therefore, the composition of the present invention is optimum for such a product as a layer-built capacitor which is used in high electric field.

EXAMPLE 2

As raw materials of the main component, $BaC_2O_4$, $Ce_2(C_2O_4)_3.9H_2O$, $3ZrO_2.CO_2.6H_2O$, CaO and $Ti_2(C_2O_4)_3.10H_2O$ of reagent first class grade are used and added with $MnCO_3$, $Cr_2O_3$, FeO, NiO and CoO of reagent first class grade as raw materials of oxides of Mn, Cr, Fe, Ni and Co and are treated in the same manner as in Example 1, and there are obtained Samples NO. 7–NO. 13.

The examination method of these samples is the same as in Example 1. The results of the examination are shown in Table 2. By adding oxides of Mn, Cr, Fe, Ni and Co, the sintering temperature and the dielectric dissipation factor can be lowered and the temperature dependence of capacitance is improved.

TABLE 2

| sample No. | main component composition ratio (mol %) | | | | | additive (wt %) | | sintering temperature (°C.) | grain size (μm) | electric characteristics | | | | |
|---|---|---|---|---|---|---|---|---|---|---|---|---|---|---|
| | BaO | CaO | $CeO_2$ | $ZrO_2$ | $TiO_2$ | | | | | dielectric constant | dielectric dissipation factor (%) | temperature dependence of capacitance | | |
| | | | | | | | | | | | | −25° C. | 85° C. | maximum value |
| 7 | 47.2 | 1.0 | 1.5 | 0.3 | 50.0 | $MnO_2$ | 0.05 | 1350 | 1.5 | 4480 | 1.5 | −5.7 | −30.6 | +6.4 |
| 8 | " | " | " | " | " | " | 0.3 | 1330 | 2.0 | 3450 | 1.3 | −4.0 | −28.5 | +5.0 |
| 9 | " | " | " | " | " | " | 0.6 | 1310 | 3.0 | 2630 | 1.0 | −1.8 | −24.0 | +2.7 |
| 10 | " | " | " | " | " | $Cr_2O_3$ | 0.05 | 1350 | 1.5 | 4530 | 1.5 | −5.5 | −31.2 | +7.1 |
| 11 | " | " | " | " | " | FeO | 0.05 | 1350 | 1.5 | 4440 | 1.5 | −5.0 | −29.5 | +6.4 |
| 12 | " | " | " | " | " | NiO | 0.05 | 1350 | 1.5 | 4550 | 1.5 | −6.0 | −30.9 | +6.8 |
| 13 | " | " | " | " | " | CoO | 0.05 | 1350 | 1.5 | 4390 | 1.4 | −4.8 | −27.3 | +5.8 |

What is claimed is:

1. $MgTiO_3$-free ceramic dielectrics having a grain size not more than five microns consisting essentially of 24.5–53.4 mol % BaO, 1.0–3.5 mol % $CeO_2$, 0.1–2.0 mol % $ZrO_2$, 0.5–10.0 mol % CaO and 45.0–60.0 mol % $TiO_2$.

2. $MgTiO_3$-free ceramic dielectrics having a grain size not more than five microns consisting essentially of a main component composed of of 24.5–53.4 mol % BaO, 1.0–3.5 mol % $CeO_2$, 0.1–2.0 mol % $ZrO_2$, 0.5–10.0 mol % CaO and 45.0–60.0 mol % $TiO_2$ and at least one oxide selected from the group consisting of $MnO_2$, $Cr_2O_3$, FeO, NiO and CoO added to said main component, the added amount thereof being 0.05–0.6 weight % of said main component.

* * * * *